(12) United States Patent
Clark

(10) Patent No.: US 6,334,007 B1
(45) Date of Patent: Dec. 25, 2001

(54) OPTICAL FIBER PULL TESTER HAVING AN ACOUSTIC SENSOR

(75) Inventor: Brett G. Clark, Whites Creek, TN (US)

(73) Assignee: Amherst Holding Co., Wilmington, DE (US)

( * ) Notice: Subject to any disclaimer, the term of this patent is extended or adjusted under 35 U.S.C. 154(b) by 0 days.

(21) Appl. No.: 09/548,725

(22) Filed: Apr. 13, 2000

(51) Int. Cl.[7] .................................................. G02B 6/00
(52) U.S. Cl. ............................... 385/12; 385/95; 356/73.1
(58) Field of Search ............................. 385/12, 95–99; 356/73.1

(56) References Cited

U.S. PATENT DOCUMENTS

| | | |
|---|---|---|
| 4,339,658 * | 7/1982 | Fromm et al. ................. 356/73.1 |
| 4,736,632 | 4/1988 | Case . |
| 5,187,767 | 2/1993 | Hayes et al. . |
| 5,386,490 | 1/1995 | Pan et al. . |
| 5,587,537 | 12/1996 | Simmons . |
| 5,680,206 * | 10/1997 | Loch ................................... 356/73.1 |

* cited by examiner

Primary Examiner—Darren Schubert
Assistant Examiner—Fayez Assaf
(74) Attorney, Agent, or Firm—Banner & Witcoff, Ltd.

(57) ABSTRACT

An optical fiber ribbon splice tester includes an acoustic sensor. A force applicator applies a tensile force to an optical fiber ribbon that contains a plurality of splices. The acoustic sensor detects sounds generated from the splices when the force is applied. A controller is connected to the acoustic sensor and is programmed to indicate when the sound corresponds to at least one defective splice.

22 Claims, 2 Drawing Sheets

OPTICAL FIBER PULL TESTER HAVING AN ACOUSTIC SENSOR

FIELD OF THE INVENTION

The present invention relates to optical fiber pull testers. More specifically, the present invention is directed to a system for testing splices with an acoustic sensor.

BACKGROUND OF THE INVENTION

Optical fibers have found an increased number of uses. As an example, modem communication systems incorporate optical fibers to take advantage of the available high bandwidth. In many systems, it is often necessary to splice optical fibers. Unfortunately, such splices sometimes fail during installation and during use. Locating and repairing a defective splice, which may be buried under ground or located within the walls of a building, can be very expensive. In order to prevent such costly repairs, optical fiber splices are routinely tested before installation and use.

A device for testing optical fiber splices is disclosed in U.S. Pat. No. 5,187,767. The disclosed device applies a force to opposite ends of a spliced optical fiber. The spliced optical fiber is retained on opposite sides of a splice by springs. One of the springs is slidable with respect to its base. A biased lever can be actuated to move the movable spring away from the other spring which applies tension to portions of the spliced optical fiber containing the splice. If the splice is defective, the user will observe a break in the splice by the fiber separating when the force is applied. Such pull testers may be effective when only a single fiber is being tested. However, such testers do not work well with multiple spliced fibers or ribbons which contain more than a single fiber and single splice. For example, if six splices are located next to each other and are tested with such a device, a failure in the splice of only one fiber will not cause a separation in the fiber group. It will only result in a proportional decrease in tension. Accordingly, the user may only observe a defect when more than one splice or a significant percentage of the splices is defective. Due to this phenomena, the effectiveness of such a tester will decrease as more spliced fibers are tested simultaneously.

Testers have been developed for testing splices used with optical fiber ribbons. Such testers apply a force to opposite ends of the ribbon while injecting light into the individual fibers. These testers require complicated and expensive light sources and detectors. Each optical fiber splice must be tested individually to ensure that none of them are defective. In addition to requiring expensive and complicated optics and electronics, tests performed with the prior art testers can be time consuming when each fiber optic cable is tested individually.

Accordingly, there exists a need in the art for an optical fiber splice tester which works with optical fiber ribbons and performs tests quickly without the need for expensive optical and electronic components.

SUMMARY OF THE INVENTION

The present invention provides an optical fiber pull tester that is capable of accurately and quickly performing tests on optical fiber ribbons at a reduced cost.

The advantages of the present invention are provided by an optical fiber ribbon splice tester that includes an acoustic sensor. A force applicator applies a tensile force to an optical fiber ribbon that contains a plurality of splices. The acoustic sensor detects sounds generated from the splices when the force is applied. A controller is connected to the acoustic sensor and is programmed to indicate when a detected sound corresponds to at least one defective splice.

The controller preferably includes an analyzer that analyzes sounds detected by the acoustic sensor and a comparator coupled to the analyzer and a memory. Analyzed sounds produced from defected splices are stored in the memory. The comparator may include a frequency comparator, a decibel level comparator or both.

In a particularly preferred embodiment, the controller includes a processing unit configured to perform a programming operation.

BRIEF DESCRIPTION OF THE DRAWINGS

The present invention is illustrated by way of example and not limited in the accompanying figures in which like reference numerals indicate similar elements and in which.

DETAILED DESCRIPTION OF PREFERRED EMBODIMENTS

Figure 1:
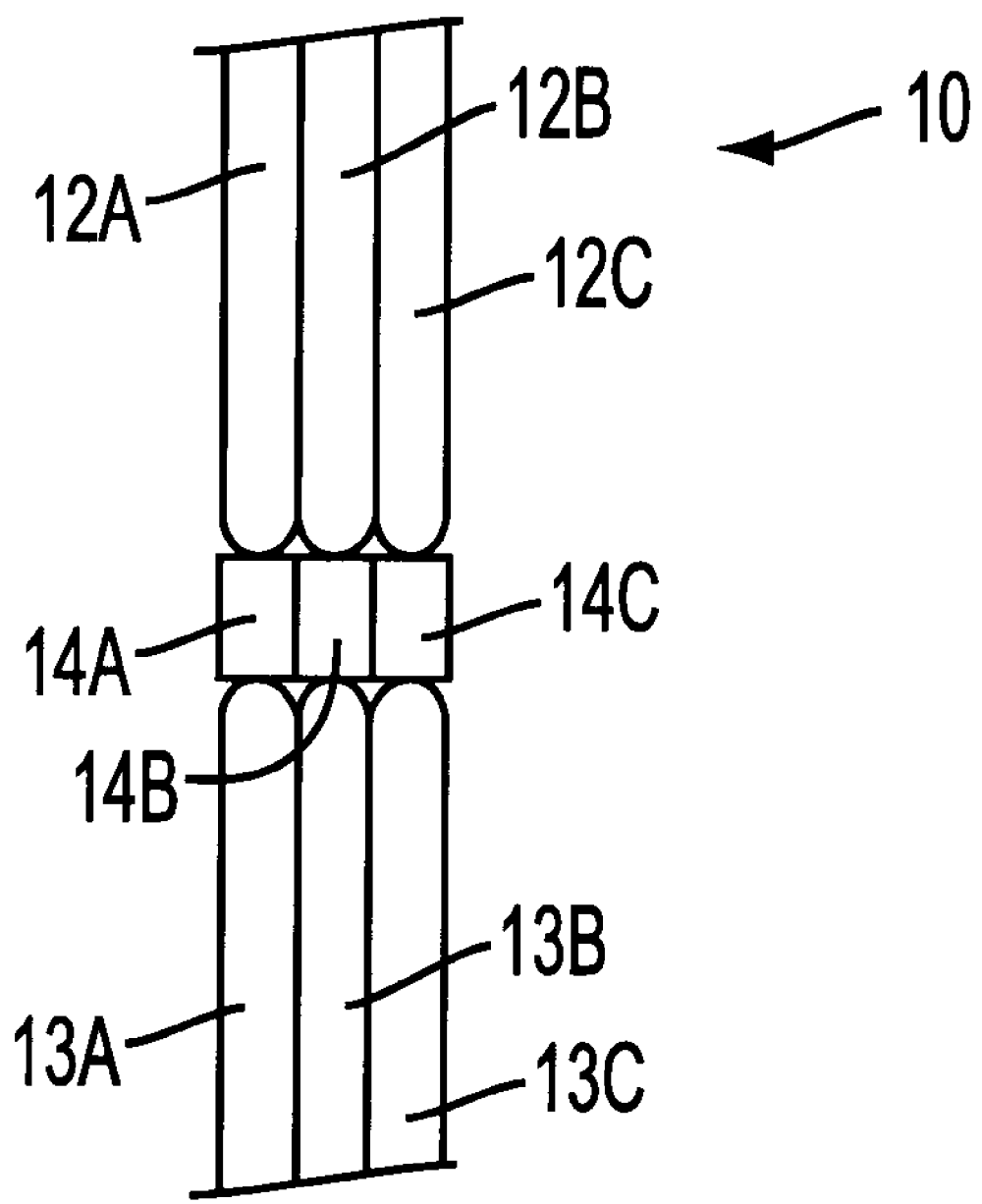
FIG. 1 shows a spliced optical fiber ribbon.

FIG. 1 shows a spliced optical fiber ribbon 10. The cladding portions of individual optical fibers 12A, 12B and 12C are fused or otherwise bonded to respective adjacent optical fibers 13A, 13B, and 13C at respective splices 14A, 14B and 14C. Three individual optical fibers are shown for illustration purposes only. The present invention may be used with a single optical fiber or optical fiber ribbons which include any number of optical fibers. Furthermore, the present invention may be used with optical fiber ribbons that include optical fibers arranged in configurations other than a straight line.

Figure 2:
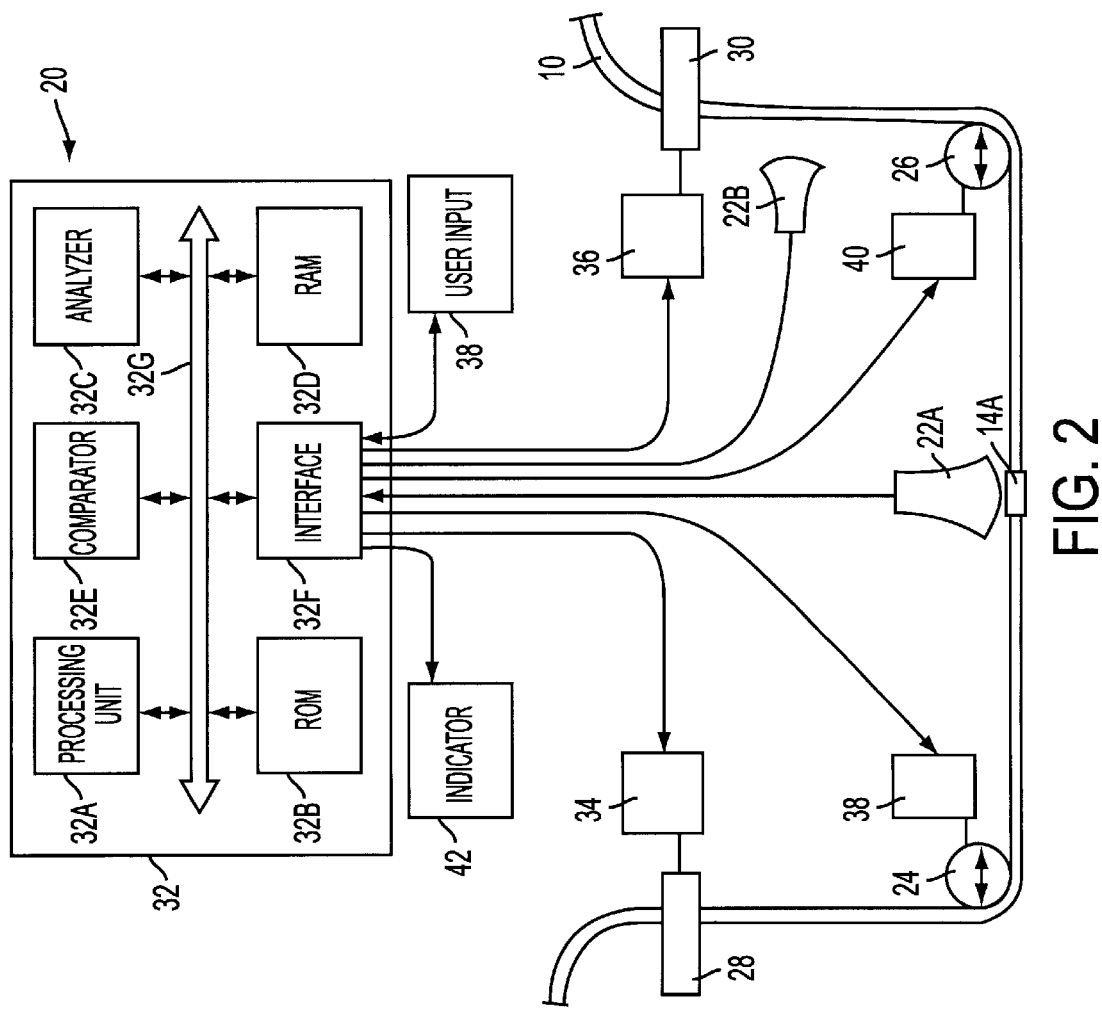
FIG. 2 is a schematic diagram of a optical fiber pull tester in accordance with a preferred embodiment of the invention.

A pull tester 20 in accordance with a preferred embodiment of the invention is shown in FIG. 2. Optical fiber ribbon 10 is inserted with the splices located adjacent to an acoustic sensor 22A. Optical fiber ribbon 10 also passes around a pair of movable rollers 24 and 26 and passes through a pair of clamps 28 and 30. A controller 32 is connected to the acoustic sensor 22A and may also be connected to movable rollers 24 and 26 and clamps 28 and 30.

The operation of pull tester 20 will now be described. Initially, the optical fiber ribbon 10 is inserted through clamps 28 and 30 and passes around movable rollers 24 and 26. The acoustical sensor 22A is preferably positioned adjacent the optical fiber. FIG. 2 shows a single optical fiber and a single splice 14A for illustration purposes only. It is understood that ribbon 10 includes additional splices located in the same region as splice 14A.

Once ribbon 10 is properly positioned, clamps 28 and 30 are closed. In one embodiment, clamps 28 and 30 are manually closed by the user. In another embodiment of the invention, a pair of actuators 34 and 36 are mechanically coupled to clamps 28 and 30 respectively. Actuators 34 and 36 are also electrically connected to controller 32. The user indicates that the optical fiber ribbon 10 is properly positioned by entering such information to the controller 32 via a user input device 38. The user input device 38 may include a keyboard, touch sensitive screen, array of switches, other input devices or any combination of such devices. After controller 32 receives an input indicating that the optical fiber ribbon 10 is properly positioned, controller 32 sends signals to actuators 34 and 36 which cause actuators 34 and 36 to close clamps 28 and 30.

The next step is to apply a tensile force to the splices. Movable rollers 24 and 26 are moved away from each other to apply the necessary testing force to the splices. The magnitude of the force applied to the splices is a function of many factors. Splices which can withstand greater tensile forces are less likely to fail during installation and use. However, as the magnitude of the tensile force applied during testing increases, so does the probability that the splice will fail during testing. The user may determine that it is cost effective to apply a relatively smaller tensile force during testing, based on the intended use of the optical fiber ribbon.

In one embodiment of the invention, the user manually applies a force to movable rollers 24 and 26. In another embodiment of the invention, a pair of actuators 38 and 40 are mechanically connected to movable rollers 24 and 26 respectively. Actuators 38 and 40 are also electrically connected to controller 32. The user enters the force information to controller 32 via user input device 38. In one implementation, the user enters the desired force in pounds per square inch or any other measure of force. In another implementation, the user may enter information about the optical fiber ribbon, the intended use and the desired probability of failure. For example, the user may indicate that the optical fiber ribbon contains 30 individual cables which are 1/16 of an inch thick and that the user wishes to ensure that the splices have a 98% chance of not failing in a 10 year period when installed and used within the walls of a building. The controller 32 processes such information and determines the force to apply based on a formula, a chart, or other predetermined information. Programing controller 32 to make such calculations and determine an appropriate force to apply is within the skill of a practitioner in the art. Once the desired force is determined, controller 32 sends a corresponding signal to actuators 38 and 40 to cause the actuators to apply the appropriate force to movable rollers 24 and 26.

It is recognized that a desired tensile force can be created in any desired manner. For example, in lieu of having both rollers 24 and 26 move away from each other, the tensile force can be created by moving a single roller 24 or 26 relative to the other roller or a fixed element and such an arrangement may be used. Furthermore, in another embodiment, one of the rollers may be removed. For example, roller 24 may be removed and clamp 28 may be located where roller 24 is shown in FIG. 2. Roller 26 may then apply a force between clamps 28 and 30. Other alternative implementations of tensile force applicators include attaching one end of optical fiber ribbon 10 to a clamp and the other end to an expanded spring, attaching one end of optical fiber ribbon 10 to a clamp and winding the other end around a take-up reel, and attaching one end of optical fiber ribbon 10 to a clamp and a weight to the other end.

When a splice fails as a result of an applied tensile force, a distinct audible indication can be detected. Acoustic sensor 22A senses the audible indication and sends a corresponding signal to controller 32. Controller 32 processes the signal and transmits a fail signal to an indicator 42. Indicator 42 may be any type of indicator that will alert the user that a defective splice has been detected. Examples of such indicators are lamps, audible devices and digital displays.

FIG. 2 shows the main components of controller 32. The operation of the controller is managed by a processing unit 32A. A ROM 32B contains the operating system used by processing unit 32A. Incoming sounds are analyzed by an analyzer 32C and previously analyzed sounds are stored in a RAM 32D. Sounds are compared by a comparator 32E. An interface circuit 32F connects the components in controller 32 to the external components. All of the components within the controller 32 are preferably connected to each other via a common data bus 32G.

In order for pull tester 20 to function properly, controller 32 must be programmed to accurately indicate when acoustic sensor 22A senses a defective splice. In accordance with one embodiment of the invention, controller 32 is preprogrammed and stores the frequency responses of sounds of several different types of splices which have failed under the application of a tensile force in RAM 32D. The preprogrammed sounds may also be stored in ROM 32B. Sounds corresponding to defective splices are a function of many factors including the number of optical fibers in the ribbon, the structure of the individual optical fibers and the number of optical fiber splices which fail. Sounds detected by acoustic sensor 22A are sent to analyzer 32C to perform a frequency analysis. The frequency analysis may be performed using a fast Fourier transform or FFT. Comparator 32E then compares the frequency response of sounds detected by acoustic sensor 22A with the analyzed sounds stored in RAM 32D to determine if the detected sound corresponds to a defective splice. Programming a controller to perform such a frequency analysis is within the skill of a practitioner in the art.

In another embodiment of the invention, the user programs controller 32. The user may enter a command to controller 32 via user input device 38 to indicate that the controller is to be programmed. Movable roller 24 and 26 are then forced apart until one or more of the splices fails. The resulting sound is detected by acoustic sensor 22A and transmitted to analyzer 32C. When controller 32 is in the "program" mode, the frequency response of a signal received from acoustic sensor 22A is analyzed by analyzer 32C and stored in RAM 32D. The programmed frequency response is then compared to sounds detected by acoustic sensor 22A when splices are tested. This embodiment is particularly preferred when the user is testing numerous optical fiber ribbons of the same configuration. Of course, the user may program numerous sounds and may use the programmed sounds in conjunction with preprogrammed sounds.

While the previous embodiments have described analyzing the frequency response of sounds sensed by acoustic sensor 22, the user may also configure controller 32 to indicate the presence of defective splices based on the decibel level and/or frequency of the sound sensed by acoustic sensor 22A. In this embodiment, analyzer 32C analyzes the decibel level of the detected sound and comparator 32E compares the analyzed decibel level to decibel levels stored in RAM 32D. Furthermore, controller 32 may be programmed to indicate the presence of defective splices based on the combination of the frequency response and the decibel level of sounds detected by acoustic sensor. In one particularly preferred embodiment, the enters a command to controller 32 via user input device 38 to indicate whether a defective splice is to be indicated based upon the frequency response, decibel level, or frequency response and decibel level of the sounds detected by acoustic sensor 22A.

In one preferred embodiment, a single acoustical sensor 22A positioned adjacent the splices 14 is used. However, an acoustical sensor 22B adjacent to the fibers, but spaced from the splice, may be used in addition to, or in lieu of, the acoustical sensor 22A. It is noted that such an acoustical sensor 22B will detect a failure as a failure will cause a vibration in the fiber. Acoustic sensors 22A and/or 22B may be located in a variety of locations including adjacent to one of the rollers 24 and 26, adjacent to one of the clamps 28 and 30, in between the splices and one of the rollers 24 and 26 and in between one of the rollers 24 and 26 and one of the clamps 28 and 30. The sounds sensed by acoustic sensors 22A and 22B will likely vary based on the position of the sensors 22A and 22B. Accordingly, the acoustic criteria corresponding to defective splices may be a function of the location of one or more of the acoustic sensors 22A and 22B.

Pull tester 20 may be in the form a stand alone tester. Such testers are convenient for testing optical fibers that have been delivered to the user with splices. In another embodiment, the elements comprising pull tester 20 may be incorporated into a splicing machine (not shown). Such an arrangement improves efficiency by eliminating the step of moving the optical fiber ribbon 10 to another machine to test.

While the present invention has been described in connection with the illustrated embodiments, it will be appreciated and understood that modifications may be made without departing from the true spirit and scope of the invention.

What is claimed is:

1. An optical fiber splice tester for detecting whether a splice of an optical fiber is defective comprising:
   an acoustic sensor that detects sounds generated from said splice upon application of a tensile force to opposite ends of said optical fiber; and
   a controller coupled to the acoustical sensor, said controller determining whether a sound detected by the acoustical sensor corresponds to a defective splice.

2. The tester of claim 1 further including a tensile force applicator that applies said tensile force.

3. The tester of claim 2 further including a user input device connected to said controller.

4. The tester of claim 2, wherein:
   said controller includes a memory storing frequency responses of sounds generated by defective splices under the application of a tensile force.

5. The tester of claim 4, wherein said controller includes:
   an analyzer that analyzes sounds detected by said acoustic sensor; and
   a comparator coupled to said analyzer and said memory.

6. The tester of claim 5, wherein said comparator comprises a frequency comparator.

7. The tester of claim 5, wherein said comparator comprises a decibel level comparator.

8. The tester of claim 5, wherein said comparator comprises a frequency comparator and a decibel level comparator.

9. The tester of claim 2, wherein said controller includes a processing unit configured to perform a programing operation comprising the steps of:
   receiving sounds corresponding to a defective splice with said acoustic sensor;
   sending said received sounds to an analyzer; and
   storing said analyzed received sounds in a memory.

10. The tester of claim 2, wherein:
    said optical fiber comprises part of an optical fiber ribbon having a plurality of splices; and
    said acoustic sensor detects sounds generated from at least one of said plurality of splices upon application of a tensile force to opposite ends of said optical fiber ribbon.

11. The tester of claim 2, further including a digital display that indicate a defective splice.

12. The tester of claim 2, wherein said acoustic sensor is positioned adjacent to said splice.

13. A method of testing splices in optical fibers comprising the steps of:
    positioning a splice of an optical fiber in close proximity to an acoustic sensor;
    applying a tensile force to said optical fiber on opposite sides of the splice;
    sensing sounds generated by said splice when said tensile force is applied; and
    determining whether said splice is defected based on said sensed sounds.

14. The method of claim 13, wherein said determining step comprises performing a frequency analysis of said detected sounds.

15. The method of claim 13, wherein said determining step comprises performing a decibel level analysis of said detected sounds.

16. The method of claim 13, wherein said determining step comprises performing a frequency analysis and a decibel level analysis of said detected sounds.

17. The method of claim 13, further including the steps of:
    allowing the user to indicate that received sounds correspond to defective splices; and
    storing said received sounds in a memory.

18. The method of claim 13, wherein
    said optical fiber comprises part of an optical fiber ribbon having a plurality of splices;
    said sensing steps comprises sensing sounds generated from at least one of said plurality of splices upon application of a tensile force; and
    said determining step determines whether at least one of said splice is defected based on said sensed sounds.

19. The method of claim 13, further including the step of:
    indicating the presence of a defective splice.

20. The method of claim 13, further including the step of:
    positioning said acoustic sensor adjacent to said splice.

21. The method of claim 13, wherein said determining step includes performing a fast Fourier transform on data from the sensed sounds.

22. An optical fiber splice tester for detecting whether a splice of an optical fiber is defective comprising:
    a tensile force applicator that applies a tensile force to opposite ends of said optical fiber; and
    a splice failure detector including at least one acoustic sensor.

* * * * *